US007254257B2

(12) United States Patent
Kim et al.

(10) Patent No.: US 7,254,257 B2
(45) Date of Patent: Aug. 7, 2007

(54) METHOD AND APPARATUS OF RECOGNIZING FACE USING COMPONENT-BASED 2ND-ORDER PRINCIPAL COMPONENT ANALYSIS (PCA)/INDEPENDENT COMPONENT ANALYSIS (ICA)

(75) Inventors: Hyun-woo Kim, Kyungki-do (KR);
Tae-kyun Kim, Kyungki-do (KR);
Seok-cheol Kee, Kyungki-do (KR);
Jong-ha Lee, Kyungki-do (KR);
Won-jun Hwang, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 874 days.

(21) Appl. No.: 10/377,748

(22) Filed: Mar. 4, 2003

(65) Prior Publication Data

US 2003/0169908 A1    Sep. 11, 2003

(30) Foreign Application Priority Data

Mar. 4, 2002   (KR) ...................... 10-2002-0011428
Sep. 30, 2002  (KR) ...................... 10-2002-0059401

(51) Int. Cl.
*G06K 9/00* (2006.01)
(52) U.S. Cl. ...................... 382/118; 382/181
(58) Field of Classification Search ................ 382/118, 382/160, 181, 190, 209, 218, 228, 305, 173; 707/3, 6
See application file for complete search history.

(56) References Cited

U.S. PATENT DOCUMENTS 5,710,833 A *   1/1998  Moghaddam et al. ....... 382/228
6,826,300 B2 * 11/2004  Liu et al. .................... 382/159

OTHER PUBLICATIONS

Qi, et al. "Hybrid Independent Component Analysis and Support Vector Machine Learning Scheme for Face Detection", IEEE, pp. 1481-1484, 2001.*
Bartlett (Face Image Analysis by Unsupervised Learning and redundancy Reduction), University of California, San Diego, pp. 1-151, 1998.*
European Search Report issued by the European Patent Office on Jan. 26, 2005 in corresponding application.
Marian Stewart Bartlett et al., "Independent component representations for face recognition," Proceedings of the SPIE—The International Society for Optical Engineering SPIE-INT., USA, vol. 3299, Jan. 1998, pp. 528-539.

(Continued)

*Primary Examiner*—Daniel Miriam
(74) *Attorney, Agent, or Firm*—Buchanan Ingersoll & Rooney PC

(57) ABSTRACT

A method and apparatus for recognizing and searching for a face using 2nd-order independent component analysis (ICA) are provided. The method for describing feature points uses 2nd-order ICA d to describe a facial image space and improve recognition performance in various illumination conditions. According to the method and apparatus, use of pose or illumination invariant face descriptor enables retrieval of human faces and authentication of a specific individual.

20 Claims, 13 Drawing Sheets
(3 of 13 Drawing Sheet(s) Filed in Color)

OTHER PUBLICATIONS

M. S. Bartlett, "Face Image Analysis by Unsupervised Learning," 2001, Kluwer, Norwell, Massachusetts, USA, pp. 46-48 and 117-119.

Marian Stewart Bartlett et al., "Viewpoint invariant face recognition using independent component analysis and attractor networks," Advances in Neural Information Processing Systems, Dec. 2, 1996, pp. 817-823.

A. Hyvarinen et al., "Independent Component 1-18 Analysis," 2001, John Wiley, New York, USA, pp. 125 and 267-268.

Takeshi Shakunaga et al., "Decomposed Eigenface for Face Recognition under Various Lighting Conditions," Proceedings 2001 IEEE Conference on Computer Vision and Pattern Recognition, Kauai, Hawaii, Dec. 8-14, 2001, vol. 1 of 2, pp. I-864-I-871.

Lei Wang et al., "Experimental Results of Face Description Based on the 2nd—order Eigenface Method," ISO/IEC JTC1/SC29/WG11, MPEG2000/M6001, May 2000, pp. 1-35.

Lei Wang et al., "A New Proposal for Face Feature Description," ISO/IEC JTC1/SC29/WG11, MPEG2000/M5750/Mar. 2000, pp. 1-6.

Hyun-Chul Kim et al., "Proposal for Face Description Using 2nd-order PCA Mixture Model," ISO/IEC JTC1/SC29/WG11, MPEG2001/M7286, Jul. 2001, pp. 1-8.

A. Z. Kouzani et al., "Multiresolution Eigenface-Components," Tencon '97, IEEE Region 10 Annual Conference, Speech and Image Technologies for Computing and Telecommunications, Proceedings of IEEE Brisbane, Old, Australia, Dec. 2-4, 1997, New York, NY, USA, vol. 1, pp. 353-356.

Stefano Cagnoni et al., "A modified modular eigenspace approach to face recognition," Image Analysis and Processing, 1999, Proceedings, International Conference on Venice, Italy, Sep. 27-29, 1999, Los Alamitos, CA, USA, IEEE Comput. Soc, US, pp. 490-495.

Li Zhao et al., "Mosaic image method: a local and global method," Pattern Recognition, Elsevier, Kidlington, GB, vol. 32, No. 8, Aug. 1999, pp. 1421-1433.

Erik Hjelmas et al., "Face Detection: A Survey," Computer Vision and Image Understanding, Academic Press, San Diego, CA, US, vol. 83, No. 3, Sep. 2001, pp. 236-274.

S. Gong et al., "Dynamic Vision: from Images to Face Recognition," 2000, Imperial College Press, London, UK, pp. 176 and 298-300.

Peter N. Belhumeur et al., "Eigenfaces vs. Fisherfaces: Recognition Using Class Specific Linear Projection," IEEE Transactions on Pattern Analysis and Machine Intelligence, IEEE Inc., New York, US, vol. 19, No. 7, Jul. 1997, pp. 711-720.

Kamei, Toshio, "*Face Retrieval by an Adaptive Mahalanobis Distance Using a Confidence Factor*," IEEE ICIP, 2002, pp. I-153-I-156.

Bartlett, Marian Stewart, "*Independent component representations for face recognition*," Proceedings of SPIE Symposium on Electronic Imaging: Science and Technology: Conference on Human Vision and Electronic Imaging III, San Jose, California, Jan. 1998.

Kim, Hyun-Chul, et al., "*Face Retrieval Using $1^{st}$-and $2^{nd}$-Order PCA Mixture Model*," IEEE ICIP, 2002, pp. II-605-II-608.

Wang, Lei, et al., "*A New Proposal for Face Feature Description*" International Organisation for Standardisation Organisation Internationale de Normalisation ISO/IEC JTC1/SC29/WG11 Coding of Moving Pictures and Audio, (MPEG00/M5750, Mar. 2000).

Nefian, Ara, et al. "*Standard Support for Automatic Face Recognition*" Organisation for Standardisation Organisation Internationale de Normalisation ISO/IEC JTC1/SC29/WG11 Coding of Moving Pictures and Audio, (MPEG01/M7251, Syndey, Jul. 2001).

\* cited by examiner

FIG. 1
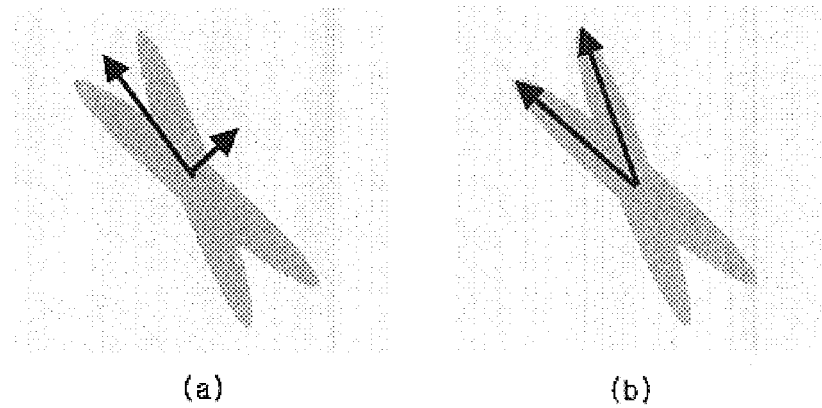
(a)        (b)
FIG. 2
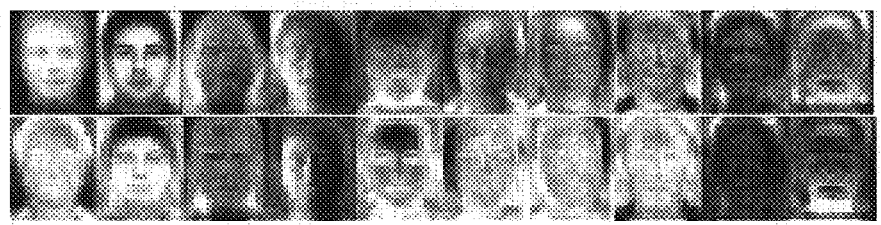
FIG. 3

METHOD AND APPARATUS OF RECOGNIZING FACE USING COMPONENT-BASED 2ND-ORDER PRINCIPAL COMPONENT ANALYSIS (PCA)/INDEPENDENT COMPONENT ANALYSIS (ICA)

This application claims priority from Korean Patent Application No. 2002-11428, filed on Mar. 4, 2002, and Korean Patent Application No. 2002-59401, filed on Sep. 30, 2002, the contents of which are incorporated herein in their entirety by reference.

BACKGROUND OF THE INVENTION

1. Field of the Invention

The present invention relates to a method and apparatus for detecting and recognizing a face using subspace analysis, and more particularly, to a method and apparatus for detecting and recognizing a face using component-based principal component analysis (PCA)/independent component analysis (ICA).

2. Description of the Related Art

In the context of image processing and interpretation, a human face is an important factor in visual determination and identification. Since the early 1990's, extensive research into face recognition and facial expression interpretation has been conducted. Recently, MPEG-7 face descriptors have been proposed for face detection and identification in a series of images. The face descriptors offer rapid and accurate detection of the same images as those to be extracted, compared to conventional face recognition algorithms. The most challenging problem in face recognition is how to operate on combinations of images showing great changes in pose and illumination. Many different approaches to solving this problem have been developed.

Wang and Tan proposed a 2nd-order eigenface method for illumination-invariant face description. Kamei and Yamada extended the scope of work to use reliability factors in order to describe facial symmetry and changes in illumination in different environments. For face description, Nefian and Davies used an embedded Hidden Markov Model (eHMM) approach based on discrete cosine transform (DCT), and Kim et al. developed a 2nd-order PCA mixture model (PMM). Unfortunately, face descriptors excluding eHMM algorithm have been found to be inefficient in coping with pose changes. To effectively cope with pose changes, the eHMM algorithm involves using unobservable embedded states corresponding to each of a number of facial regions and segmenting an image into overlapping image blocks. However, HMM algorithms have a problem in that they tend to be dependent on local minimum values unless an initial solution approximates an overall minimum threshold.

A 2nd-order PCA method was proposed by Wang and Tan based on the observations that principal components corresponding to leading eigenvalues describe illumination changes rather than identity. First, PCA is performed on a set of training images. Images reconstructed from leading principal components corresponding to a first ten eigenvalues represent low-frequency components so the leading eigenvalues are sensitive to illumination variation. Then, the training images are obtained by subtracting the leading principal components from the reconstructed image. These images are called residual images and contain high-frequency components that are less sensitive to illumination variation. Lastly, the PCA is performed on the residual images obtained by subtracting illumination variant features.

A 2nd-order PCA mixture model was introduced by Kim et al. to evaluate the probability distribution of various patterns in the facial image space. Kamei and Yamada added reliability factors in order to describe facial symmetry and changes illumination in different environments.

Barlett contended that ICA produces better basis images for face description than PCA, since ICA extracts important information from the facial image space containing higher order relationships among image pixels. This was proven by experimentally, as the experimental results on FERET face datasheet show. As shown in FIG. 1, an ICA representation is superior to a PCA representation, which is due to difference in selection of basis vectors. That is, when a data distribution is not Gaussian, PCA fails to accurately describe the data while ICA is able to appropriately describe the data since PCA basis vectors are orthogonal to each other.

To overcome problems with pose variation in face recognition, several component-based techniques for representing facial images as a set of facial components have been developed. In IEEE International Conference on Acoustics, Speech, and Signal Processing, Nefian and Davies used embedded HMM for face modeling. The facial components are internally modeled by HMM, and an optimization technique is used to match image blocks segmented from a facial image against the model. Similar face representation has been proposed by Wiskott et al. in IEEE Transactions on Pattern Analysis and Machine Intelligence, where they use a labeled graph based on a Gabor wavelet transform to represent facial components. This method also uses the phases of complex Gabor wavelet coefficients to accurately compute the positions of nodes for facial features. A component-based approach has also been developed by Heisele et al. in IEEE International Conference on Computer Vision. This approach involves detecting facial components independently to compensate for pose changes, and then using a support vector machine (SVM) geometrical configuration classifier to verify the geometrical configuration of the detected components against the model.

Typically, however, conventional PCA and ICA methods encode position relations among all pixels. Thus, statistically, changes in position configuration due to pose variation lead to significant changes in face representation.

SUMMARY OF THE INVENTION

The present invention provides a method and apparatus of generating feature information on a predetermined facial image using component-based principal component analysis (PCA)/independent component analysis (ICA).

The present invention also provides a method and apparatus of recognizing a face using component-based PCA/ICA.

The present invention also provides a method and apparatus of searching for a face using component-based PCA/ICA.

According to an aspect of the present invention, there is provided a method of recognizing a face using component-based independent component analysis (ICA)/principal component analysis (PCA), the method comprising segmenting a predetermined input facial image by facial components and generating segmented images, performing PCA on the segmented images and generating low-pass filtered images, subtracting the low-pass filtered images from the segmented images and obtaining residual images, and performing ICA on the residual images and generating first feature information corresponding to the segmented images, and generating pieces of second feature information as a set of the pieces of the first feature information.

According to another aspect of the present invention, there is provided a method of recognizing a face using component-based PCA/ICA, the method comprising receiving a first facial image to be recognized and a second facial image as a basis for comparison with the first facial image, performing component-based PCA/ICA on the first and second facial images, respectively and extracting pieces of second feature information corresponding to the first and second facial images, and determining whether there is a similarity between the pieces of the second feature information corresponding to the first and second facial images, and outputting the determination result.

The performing of the component-based PCA/ICA comprises segmenting the first and second facial images by facial components and generating first and second segmented images, performing PCA on the first and second segmented images and generating first and second low-pass filtered images corresponding thereto by removing high-frequency components from the first and second segmented images, subtracting the low-pass filtered images from the first and second segmented images and obtaining first and second residual images having only high-frequency components, and performing ICA on the first and second residual images to generate pieces of first feature information corresponding to the first and second segmented images, and generating pieces of second feature information as sets of pieces of the corresponding first feature information.

The determining of similarity comprises expressing the pieces of first feature information corresponding to the first and second segmented images in vectors, obtaining a first result values obtained by dividing the inner product of a pair of vectors corresponding to the same components of the first and second facial images by norms of the vectors, and obtaining the sum of the first result values and determining that the first and second facial images are from the same person if the sum is greater than a predetermined reference value.

The obtaining of the sum of the first result values comprises obtaining the sum of a second result values multiplied by a predetermined weighting factor, respectively, and determining that the first and second facial images are from the same person if the sum is greater than a predetermined reference value.

According to still another aspect of the present invention, there is provided a method of searching for a face using component-based PCA/ICA, the method comprising constructing a database (DB) in which facial images of one or more persons and identification information of the persons are stored, receiving an arbitrary facial image to be searched for from the DB, performing the component-based PCA/ICA on the facial image to be searched for and generating second feature information, sequentially reading facial images stored in the DB, and performing the component-based PCA/ICA on the read facial images and generating second feature information, comparing the second feature information corresponding to the facial image read from the DB with the second feature information corresponding to the facial image to be searched for, and determining whether the two facial images are from the same person, reading identification information corresponding to the facial image from the DB and outputting the same if it is determined that the two facial images are from the same person.

Here, the second feature information is generated by segmenting the facial images by facial components and generating segmented facial images, performing PCA on the segmented facial images and generating low-pass filtered images by removing high-frequency components from the segmented facial images, subtracting the low-pass filtered images from the segmented images and generating residual images corresponding to the segmented facial images, and performing ICA on the residual images which correspond to the segmented facial images and generating pieces of first feature information, which are ICA coefficient matrices, and generating pieces of second feature information as sets of pieces of the corresponding first feature information.

The comparing of the second feature information corresponding to the facial image read from the DB with the second feature information corresponding to the facial image to be searched for, comprises expressing the pieces of first feature information corresponding to the facial image to be searched for and the facial image stored in the DB, in vectors, obtaining a first result values obtained by dividing the inner product of a pair of vectors corresponding to the same components of the both facial images by norms of the vectors, and obtaining the sum of the first result values and determining that the both facial images are from the same person if the sum is greater than a predetermined reference value.

Also, the obtaining of the sum of the first result values comprises obtaining result values by multiplying the respective first result values by a predetermined weighting factor, and if the sum is greater than a predetermined reference value, determining that the two facial images are from the same person.

According to still another aspect of the present invention, there is provided a method of searching for a face using component-based PCA/ICA, the method comprising constructing a database (DB) in which facial images of one or more persons and identification information of the persons are stored, receiving an arbitrary facial image to be searched for from the DB, performing the component-based PCA/ICA on the facial image to be searched for and generating second feature information, and detecting the second feature information similar to the second feature information corresponding to the facial image to be searched for from the DB and outputting the same.

According to still another aspect of the present invention, there is provided an apparatus of generating feature information using component-based PCA/ICA, the apparatus comprising an image segmenting portion which segments a predetermined input original facial image by facial components contained in the input original facial image and generates segmented facial images, a low-pass filtered image generator which performs PCA on the segmented facial images and generates low-pass filtered images by removing high-frequency components from the input image, a residual image generator which subtracts the low-pass-filtered images from the segmented images and generates residual images having only the high-frequency components, and an ICA coefficient matrix calculator which performs ICA on the residual images and generates pieces of first feature information corresponding to the segmented images, and generates pieces of second feature information as a set of the pieces of first feature information.

Also, the present invention provides an apparatus of extracting a face using component-based PCA/ICA, the apparatus comprising an input portion which receives a first facial image to be recognized and a second facial image as a basis for comparison with the first facial image, a feature information generator which performs component-based PCA/ICA on the first and second facial images and generates pieces of second feature information as a set of ICA coefficient matrices corresponding to the components, and a comparator which compares a piece of second feature information corresponding to the first facial image with that of the second facial image to determine whether there is a similarity therebetween, and outputs the determination result.

The feature information generator comprises an image segmenting portion which segments the input original facial image by facial components and generates segmented facial images, a low-pass filtering portion which performs PCA on the segmented images and generates low-pass filtered images by removing high-frequency components from the segmented images, a residual image generator which subtracts the low-pass filtered images from the segmented images and generates residual images having only the high-frequency components, and an ICA coefficient matrix calculator which performs ICA on the residual images and generates pieces of first feature information corresponding to the segmented images, and generates pieces of second feature information as a set of the pieces of first feature information.

Alternatively, according to the present invention, there is provided an apparatus of searching for a face using component-based PCA/ICA, the apparatus comprising an input portion which receives facial images used in constructing a facial image information database (DB) or the facial image to be searched for included in the DB, a feature information generator which receive facial images from the input portion, performs the component-based PCA/ICA on the facial images and generating pieces of second feature information corresponding to the facial images, a DB managing portion which stores the second feature information corresponding to the facial images used in constructing the DB, supplied from the feature information generator, and manages the information to be stored in the DB, and a comparator which receives the second feature information corresponding to the facial image to be searched for from the feature information generator, searches for second feature information whose similarity with the received second feature information is greater than a predetermined reference value, and determines that the two facial images are from the same person.

The DB managing portion receives and stores the facial images used in constructing the DB from the input portion, the comparator sequentially reads facial images stored in the DB and supplies the same to the feature information generator, receives pieces of second feature information corresponding to the facial image, compares the same with the second feature information corresponding to the facial image to be searched for, and determines whether the two facial images are from the same person, and the feature information generator receives the facial image to be searched for from the input portion, receives the facial image in the DB from the comparator, performs the component-based PCA/ICA on the facial images and generates pieces of second feature information corresponding to the facial images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above objects and advantages of the present invention will become more apparent by describing in detail preferred embodiments thereof with reference to the attached drawings in which:

FIGS. 1A and 1B show principal component analysis (PCA) and independent component analysis (ICA), respectively;

FIG. 2 conceptually shows ICA;

FIG. 3 shows a first ten basis images extracted with 1st-order PCA on the first line and first ten basis images extracted with 1st-order ICA on the second line;

DETAILED DESCRIPTION OF THE INVENTION

Figure 4:
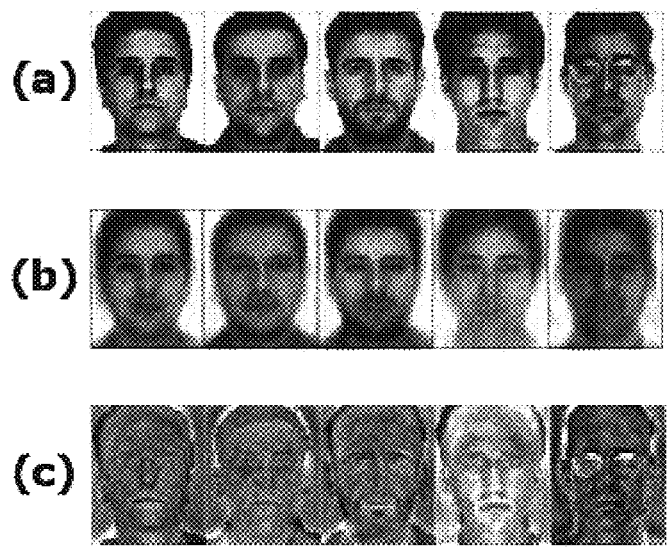
FIG. 4A shows original facial images.
FIG. 4B shows images reconstructed using a first ten principal components extracted with ICA.
FIG. 4C shows residual images extracted with ICA on the third line.

This invention represents a new approach to cope with changes in pose and illumination conditions. First, 2nd-order independent component analysis (ICA) has been adopted in order to describe a facial image space and improve recognition performance in a combination of illumination changes. Furthermore, in order to overcome a problem with pose changes, an MPEG-7 face descriptor has been proposed as a component-based design. The component-based MPEG-7 face descriptor is applied to segment a facial area into different facial components such as eyes, nose, forehead, and mouth in order to effectively compensate for pose and illumination variations and encode facial images at full image resolution.

The 2nd-order ICA descriptor proposed in the present invention will now be described in detail.

While an original ICA subtracts independent components (i.e., independent basis components) from gray scale images, the proposed 2nd-order ICA is robust to illumination variation since it is applied to make the residual images correspond to high pass frequency components.

ICA will first be explained. It is assumed that a combination of M images are given as training images from which basis images are extracted, and $\phi_i$ is a raster-scanned vector corresponding to an i-th training image having a dimensionality N, where N is the number of pixels and M is typically smaller than N (M<N). The mean vector m of the combination of images is $$\frac{1}{M}\sum_{i=1}^{M} \phi_i.$$

The mean vector is subtracted from the raster-scanned vector $\phi$ of each training image to obtain $X_i = \phi_i - m$, which is an M×N matrix $X = [x_1, \ldots, x_M]^T$, having zero mean. Here, a covariance matrix of data is represented by $X^T X$. Since the goal of ICA is to find an N×N invertible matrix $W^{(0)}$, the rows of $U^{(0)} = W^{(0)} X$ are statistically independent, and facial images X are used as basis images. That is, $W^{(0)-1} U^{(0)}$ represented by independent rows $U^{(0)}$. As shown in FIG. 2, an ICA representation of the facial images X is a linear combination of basis images $u_i$ where i is an integer ranging from 1 to N. To achieve illumination invariant face description, the original ICA algorithm is extended to 2nd-order ICA.

The 2nd-order ICA adopted in the present invention will now be described in detail.

PCA is performed on an original facial image X to extract eigenvalues and eigenvectors of M training images. To describe low-frequency components of the facial images, a first maximum eigenvector $M_1$ is selected ($M_1$<M), and a leading eigenvector $R_{M1}$, which is the projection of data for $M_1$, is defined by Equation (1):

$$R_{M1} = X P_{M1} \qquad (1)$$

where $P_{M1} = [P_1, \ldots, P_{M1}]$ denotes a set of selected eigenvectors and $P_i$ denotes an eigenvector corresponding to an i-th maximum eigenvalue. To reduce the number of independent sources to a tractable number and achieve a simple reconstruction, ICA is performed on $P^T_{M1}$ in place of X. This yields an independent basis image $U_{M1}$ for $M_1$ which is defined by Equation (2):

$$U_{M1} = W_{M1} P^T_{M1} \qquad (2)$$

where $W_{M1}$ denotes a convertible $M_1 \times M_1$ weight matrix that makes the rows of $U_{M1}$ statistically independent of each other. The weight matrix $W_{M1}$ is evaluated by algorithm developed by Bell and Sejnowski, and a corresponding matrix $U_{M1}$ contains statistically independent basis images which are a low-pass filtered version of training images. A low-pass filtered facial image $\bar{X}$ is calculated by multiplying $P^T_{M1}$ by both sides of Equation (1), and can be defined as shown in Equation (3):

$$\bar{X} = R_{M1} P^T_{M1} \qquad (3)$$
$$= (X P_{M1})(W^{-1}_{M1} U_{M1})$$
$$= (X P_{M1} W^{-1}_{M1}) U_{M1}$$

That is, the low frequency component $\bar{X}$ is spanned by the independent basis image $U_{M1}$ and ICA coefficient $B_{M1}$ is represented as $X P_{M1} W_{M1}^{-1}$. Eventually, the 1st-order ICA transformation matrix $T_{M1}$ is calculated by $T_{M1} = P_{M1} W_{M1}^{-1}$. Examples of basis images $P_{M1}$ and $U_{M1}$ are illustrated in FIG. 3.

Next, the residual images corresponding to high-pass filtered images are calculated by subtracting the original facial images from the reconstructed images corresponding to low-pass filtered images, and ICA is performed on the residual images. An i-th residual image $\Delta x_i$ is represented by $\Delta x_i = x_i - \bar{x}_i$ where $\bar{x}_i$ represents i-th column in $\bar{x}$. A residual matrix is defined by $\Gamma \equiv X - \bar{X} = [\Delta x_1, \ldots, \Delta x_M]^T$. Similar to the 1st-order ICA transformation, when ICA is performed on $P'^T_{M2} = [P'_1, \ldots, P'_{M2}]^T$, $P'_i$ denotes an eigenvector corresponding to an i-th maximum eigenvalue and a 2nd-order ICA reconstruction $\Gamma$ of the residual images is given by Equation (4):

$$\Gamma = (\Gamma P'_{M2} W'^{-1}_{M2}) U'_{M2} \qquad (4)$$

where $U'_{M2}$ and $W'_{M2}$ denote an independent basis image for $M_2$ and a convertible $M_2 \times M_2$ weight matrix that makes the rows of $U'_{M2}$ statistically independent of each other, respectively. Equation (4) may be reexpressed as Equation (5) in terms of the original matrix X using $\Gamma \equiv X - \bar{X}$:

$$\Gamma = (X - \bar{X})(P'_{M2} W'^{-1}_{M2}) U'_{M2} \qquad (5)$$
$$= (X - X P_{M1} W^{-1}_{M1} U_{M1})(P'_{M2} W'^{-1}_{M2}) U'_{M2}$$
$$= [X(P'_{M2} W'^{-1}_{M2} - P_{M1} W^{-1}_{M1} U_{M1} P'_{M2} W'^{-1}_{M2})] U'_{M2}$$

That is, the low frequency component $\Gamma$ is spanned by the independent basis image $U'_{M2}$ and ICA coefficient $B'_{M2}$ is represented as $X(P'_{M2} W'^{-1}_{M2} - P_{M1} W^{-1}_{M1} U_{M1} P'_{M2} W'^{-1}_{M2})$. Eventually, the 2nd-order ICA transformation matrix $T'_{M2}$ is defined by $T'_{M2} = P'_{M2} W'^{-1}_{M2} - P_{M1} W^{-1}_{M1} U_{M1} P'_{M2} W'^{-1}_{M2}$. FIG. 4A illustrates examples of original image X, FIG. 4B illustrates its reconstructed low-pass filtered image $\bar{X}$, and FIG. 4C illustrates the residual image $\Gamma$.

To reduce the bit rate and improve the performance of the ICA representation, a subset of ICA coefficients having maximum discriminability values $K_1$ and $K_2$ defined by the ratio of between-class to within-class variances are selected from independent basis images $U_{M1}$ and $U'_{M2}$ and denoted by $U_{K1}$ and $U'_{K2}$. The corresponding transformation matrices $T_{K1}$ and $T'_{K2}$ are defined by Equations (6):

$$T_{K1} = P_{K1} W^{-1}_{K1}$$
$$T'_{K2} = P'_{K2} W'^{-1}_{K1} - P_{K1} W^{-1}_{K1} U_{K1} P'_{K1} W^{-1}_{K2} \qquad (6)$$

Figure 5A:
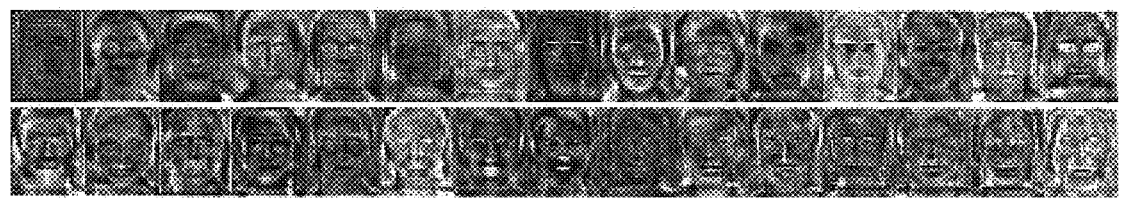
FIGS. 5A and 5B show thirty basis images selected from a 2nd-order PCA model and thirty basis images selected from a 2nd-order ICA model, respectively.
Figure 5B:
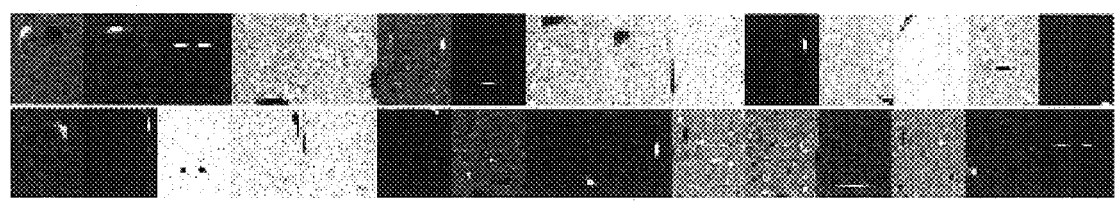

Although the transformation matrices $T_{K1}$ and $T'_{K2}$ are different from $T_{M1}$ and $T'_{M2}$ in terms of dimensionality and permutation, they are regarded as being the same. FIG. 5A shows basis images obtained with 2nd-order PCA and FIG.

5B shows basis images obtained with 2nd-order ICA. Eventually, the 2nd-order ICA representation consists of a basis image $U=[U_{K1} U'_{K2}]^T$ and a coefficient matrix. The coefficient matrix B is defined by Equation (7):

$$B = XT \quad (7)$$

where $T=[T_{K1} T'_{K2}]^T$ denotes a transformation matrix. Thus, if the basis image U has a fixed value, the facial image X is represented by the second ICA coefficients B derived from Equation (7). In this case, the transformation matrix T is precalculated from a training image set. Hereinbelow, ICA coefficient matrix is referred to as first feature information.

When two facial images $x_1$ and $x_2$ represented by the ICA coefficients $b_1$ and $b_2$ ($b_1=x_1T$, $b_2=x_2T$) are given, similarity $d(b_1, b_2)$ is measured by calculating cross-correlation between them and defined by Equation (8):

$$d = \frac{b_1 \cdot b_2}{\|b_1\|\|b_2\|} \quad (8)$$

where $b_1 \cdot b_2$ denote the inner product of vectors $b_1$ and $b_2$, and $\|b_1\|$ and $\|b_2\|$ denote the norms of vectors $b_1$ and $b_2$, respectively.

Next, a method and apparatus of recognizing a face using component-based PCA/ICA that are robust against a pose change, will be explained.

In this invention, a component-based scheme is combined with the 2nd-order ICA to cope well with pose changes in face recognition and effectively represent a face image. The face image is segmented into different facial components, i.e., forehead, eyes, nose, cheek, chin, and mouth. Each of the components is projected onto 2nd-order ICA basis image which is obtained from the previous training set.

Figure 6A:
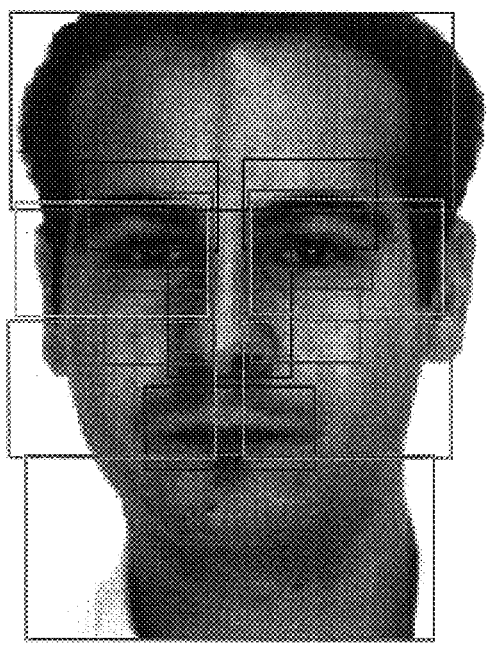
FIG. 6A shows an original facial image.
Figure 6B:
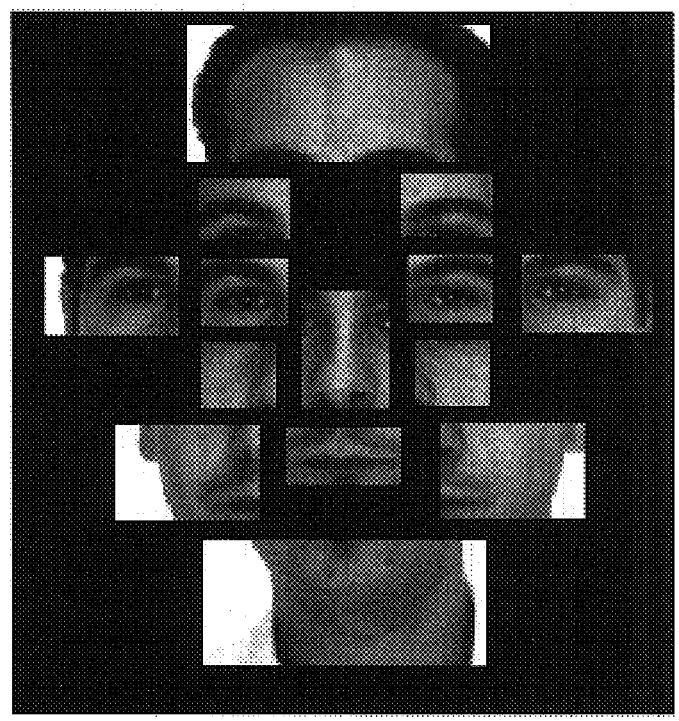
FIG. 6B shows fourteen facial components selected from the original facial image of FIG. 6A.

FIG. 6A shows an original facial image, and FIG. 6B shows fourteen facial components selected from the original facial image of FIG. 6A.

As shown in FIGS. 6A and 6B, in this invention, the overall facial image is segmented into fourteen facial components. To avoid dependency in a data set, components such as eyebrow, eyes, nose and mouth defined by Heisele et al. in IEEE International Conference on Computer Vision are mainly used as components in this invention. Other components such as forehead, cheek, and chin are selected similarly to those defined by Nefian and Davies in IEEE International Conference on Acoustics, Speech, and Signal Processing. Since component positions must contain meaningful facial features, several fiducial points are manually positioned and mean positions of facial components are calculated based on the fiducial points. The calculation is made from the training dataset.

It is assumed that a given image x is divided into L facial components. When 2nd-order ICA is performed on i-th facial component $C^{(i)}$, the component $C^{(i)}$ is represented by a coefficient vector $b^{(i)}$ having a matrix $U^{(i)}$ of basis images which is a matrix representation of 2nd-order ICA transformation $T^{(i)}$. In this case, $U^{(i)}$ and $T^{(i)}$ are calculated from a training set of the i-th facial component $C^{(i)}$. Eventually, the facial image X is represented as a set of coefficient vectors $b^{(1)}, \ldots, b^{(L)}$ having basis images $\{U^{(1)}, \ldots, U^{(L)}\}$. Hereinbelow, a set of ICA coefficient matrices by component of the facial image X is referred to as second feature information.

When two facial images $x_1$ and $x_2$ represented by ICA coefficients $b_1$ and $b_2$ are given, similarity $d(b_1, b_2)$ is measured by calculating cross-correlation between corresponding components.

$$d = \frac{1}{L} w_1 \left\{ \frac{b_1^{(1)} \cdot b_2^{(1)}}{\|b_1^{(1)}\|\|b_2^{(1)}\|} + \ldots + w_L \frac{b_1^{(L)} \cdot b_2^{(L)}}{\|b_1^{(L)}\|\|b_2^{(L)}\|} \right\}$$

Here, $b_1(i)$ and $b_2(i)$ are 2nd-order ICA coefficients of i-th facial component $C^{(i)}$ for facial images $x_1$ and $x_2$, respectively, and $w_i$ is a weighting factor of i-th facial component $C^{(i)}$.

In order to determine a weighting factor, components are aligned according to class discriminability which is defined by the ratio of between-class to within-class variances. The class discriminability values are selected from independent basis images calculated only from each training dataset.

When components are sequentially accumulated and retrieval performance is calculated from a training dataset, as the number of components increase, the present invention achieve the better performance on average normalized modified retrieval rank (ANMRR) and formula image retrieval (FIR), except for the case where the mouth component is added causing large variation in facial expression. In this invention, all components except mouth are chosen equally. That is, the weighting factor $w_i=1$ with i ranging from 1 through 13 and weighting factor corresponding to mouth $w_{14}=0$. The number of components and weighting factor will be optimized later.

Figure 7:
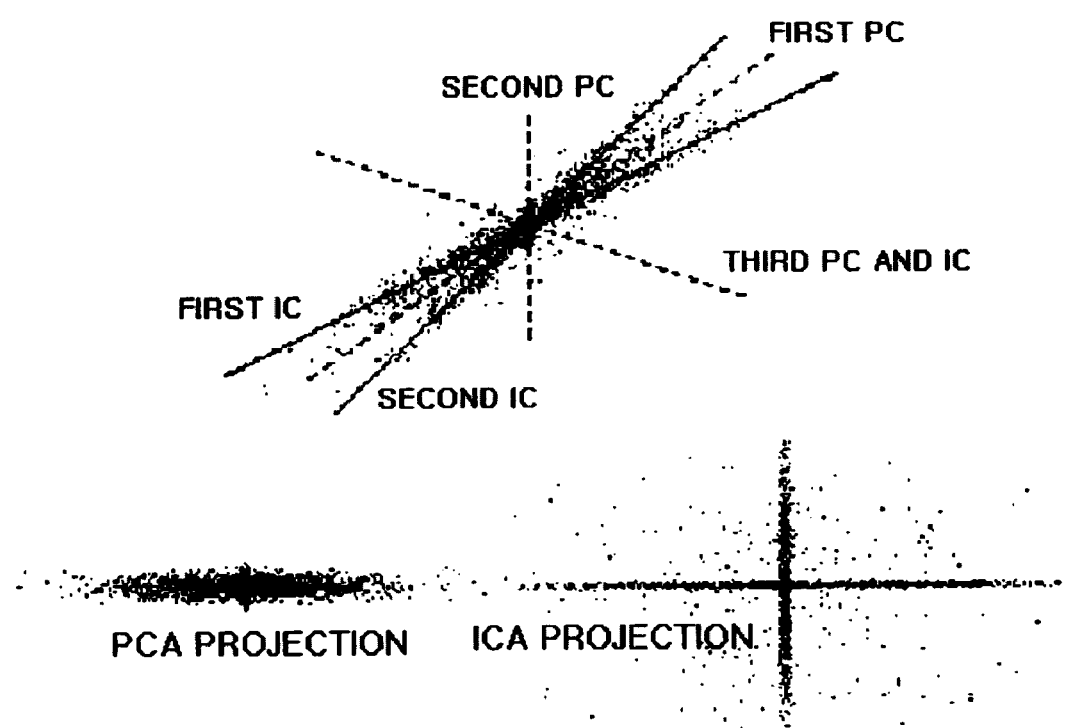
FIG. 7 is a conceptual view showing an effective facial image representation method using ICA.

FIG. 7 is a conceptual view showing an effective facial image representation method using ICA.

Experimental results of the present invention will now be described. The configuration of experiments conducted according to this invention is summarized in Table 1. In addition to the results of these five experiments, results of experiments on components based on 2nd-order ICA face descriptor and 2nd-order ICA are also presented. In order to examine potential performance improvement in the component-based approach according to this invention, simulation results showing detection of all components by manually found landmarks is also presented. By conducting Experiments 1 and 2, different proposals such as results provided by NEC and POSTECH were compared with those provided by the present invention. 200 images were used as a training set for Version 1.0 descriptor (face_0066_01~face_0085_5 and face_0181_01~face_0200_5). A test set varies from experiment to experiment as can be seen in Table 1 below. Other experiments were performed on an MPEG-7 face dataset extended to VCE-4. The same training set as in the previous experiments was used in Experiment 3, and Experiment 4 was performed on a newly defined training set proposed in VCE-4 reflector by Kamei.

TABLE 1

| | | TEST SET | |
|---|---|---|---|
| | TRAINING SET | Illumination set | Pose set |
| Experiment 1 (M6001) | 200 images: 40 persons*5images/person<br><br>face_0066_01-face_0085_05<br><br>face_0181_01-face_0200_05 | 745 images: 149persons* 5images/person<br>face_0001_01-face_0065_05<br><br>face_0086_01-face_0169_05 | 410 images: 82persons*5images/person<br>face_0170_01-face_0180_05<br>face_0201_01-face_0271_05 |

TABLE 1-continued

| | | TEST SET | |
|---|---|---|---|
| | TRAINING SET | Illumination set | Pose set |
| Experiment 2 (M7286) | | 350 images: 70persons* 5images/person | 205 images: 41persons*5images/person face__0231__01- face__0271__05 |
| | | face__0001__01- face__0035__05 face__0116__01- face__0150__05 | |
| Experiment 3 | | 1015 images: 203persons* 5images/person | 1960 images: 392persons* 5images/person |
| Experiment 4 | 1685 images: 337 persons*5images/ person (the image files whose person ID field is even + training set used by Version 1.0 descriptor) | 1490 images: 298 persons*5images/person (the image files whose person ID field is odd training set used by Version 1.0 descriptor) | |

Tables 2 and 3 compare the results obtained with the method proposed by this invention with those obtained from Experiments 1 and 2 for other proposals. According to the results of Experiments 1 and 2, the 2nd-order ICA face descriptor was shown to produce poor results in a pose set but improved retrieval performance in an illumination set, compared to some proposals (Version 1.0, NEC, and POSTECH). In contrast, the component-based face descriptor was shown to improve retrieval effectiveness in both data sets compared to the other proposals. The results achieved by manual alignment are superior to those by a component-based face descriptor without alignment. Thus, the component-based 2nd-order ICA face descriptor was shown to be much less sensitive to illumination variation, while the 2nd-order ICA face descriptor was shown to provide approximately the equivalent results as other proposals. The reason the 2nd-order ICA face descriptor gave poor results is that the defined training set in Version 1.0 does not have a sufficient pose dataset in a test dataset to enable a good grasp of pose variation. Thus, as shown in Table 4, if the test dataset is extended without updating the training dataset, similar results are obtained.

TABLE 2

| | Illumination Set | | Pose Set | |
|---|---|---|---|---|
| | ANMRR | FIR | ANMRR | FIR |
| Ver1.0 | 0.234 (0.266*) | 0.125 (0.403*) | 0.492 (0.442*) | 0.354 (0.585*) |
| NEC | 0.214* | 0.342* | 0.348* | 0.491* |
| 2nd-order ICA | 0.202 | 0.097 | 0.467 | 0.290 |
| Component-based 2nd-order ICA | 0.152 | 0.071 | 0.326 | 0.205 |
| Manual alignment | 0.135 | 0.052 | 0.277 | 0.136 |

TABLE 3

| | Illumination Set | | Pose Set | |
|---|---|---|---|---|
| | ANMRR | FIR | ANMRR | FIR |
| Ver1.0 | 0.270* | 0.414* | 0.318* | 0.466* |
| POSTECH | 0.236* | — | 0.234* | — |
| NEC | 0.226* | 0.354* | 0.217* | 0.350* |
| 2nd-order ICA | 0.221 | 0.128 | 0.302 | 0.190 |
| Component-based 2nd-order ICA | 0.187 | 0.108 | 0.176 | 0.058 |
| Manual alignment | 0.170 | 0.082 | 0.159 | 0.043 |

TABLE 4

| | Illumination Set | | Pose Set | |
|---|---|---|---|---|
| | ANMRR | FIR | ANMRR | FIR |
| Ver1.0 | 0.300 | 0.183 | 0.689 | 0.486 |
| 2nd-order ICA | 0.277 | 0.149 | 0.674 | 0.456 |
| Component-based 2nd-order ICA | 0.233 | 0.129 | 0.482 | 0.253 |
| Manual alignment | 0.236 | 0.131 | 0.383 | 0.172 |

In Table 4, in which the results of experiment 3 are shown, the training dataset was extended as proposed in VCE reflector by Kamei. This new definition of training/test data set is required for the following reasons. First, this allows the training dataset to contain a sufficient amount of pose variation information to be learned. Second, this eliminates the need for separate illumination variation and pose variation datasets, which seems more natural from a real application standpoint.

As is evident from Table 5 showing the results of Experiment 4, performance improvements were achieved in both the 2nd-order ICA face descriptor and the component-based 2nd-order ICA face descriptor. In order to reduce the complexity of feature extraction, experiments with the component-based ICA method are conducted after subsampling the original image (256 by 256 pixels) by a factor of one fourth (128 by 128 pixels) and by a factor of one sixteenth (64 by 64 pixels).

TABLE 5

| | ANMRR | FIR |
|---|---|---|
| Ver1.0 | 0.499 | 0.306 |
| 2nd-order ICA | 0.367 | 0.205 |
| Component-based 2nd-order ICA (1/4 times) | 0.264 | 0.112 |
| Component-based 2nd-order ICA (1/16 times) | | |

The 2nd-order ICA and component-based ICA face descriptors obtained experimental results showing that these algorithms are robust and accurate despite variations in illumination conditions and pose.

Preferred embodiments of the present invention will now be described in detail with reference to the accompanying drawings.

Figure 8:
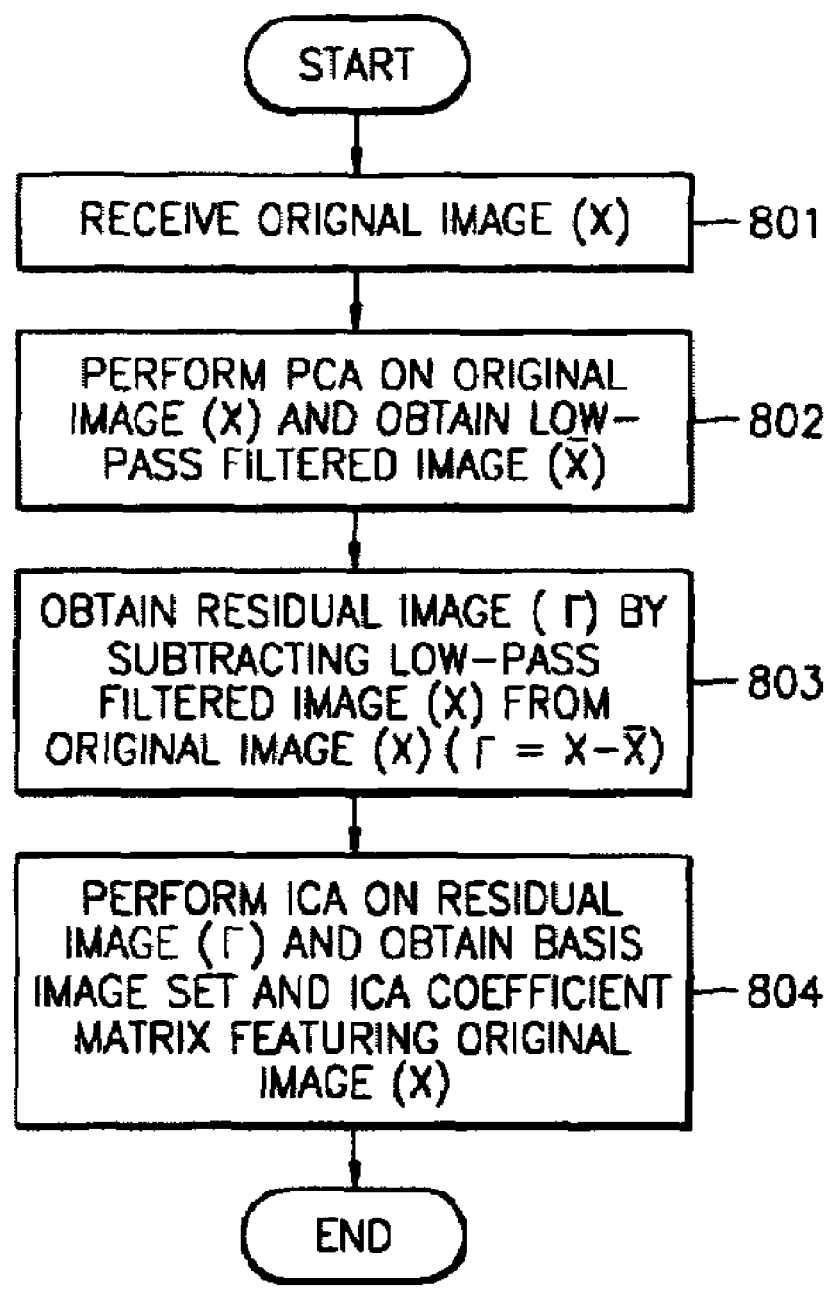
FIG. 8 is a flow chart diagram of a method of extracting first feature information of a predetermined image using 2nd-order ICA according to an embodiment of the present invention.

FIG. 8 is a flow chart diagram of a method of extracting first feature information of a predetermined image using 2nd-order ICA according to an embodiment of the present invention. In step 801, original images X are received. In step 802, PCA is performed on the original images X to obtain low-pass filtered images $\overline{X}$. In step 803, the low-pass filtered images $\overline{X}$ are subtracted from the original images X to obtain the residual images Γ. In step 804, ICA is performed on the residual images Γ to obtain basis images, which is second ICA feature information featuring the original images X, and ICA coefficient matrix (first feature information corresponding to the facial image).

Details of steps 801 through 804 are the same as described above in Equations 1 through 8.

Figure 9:
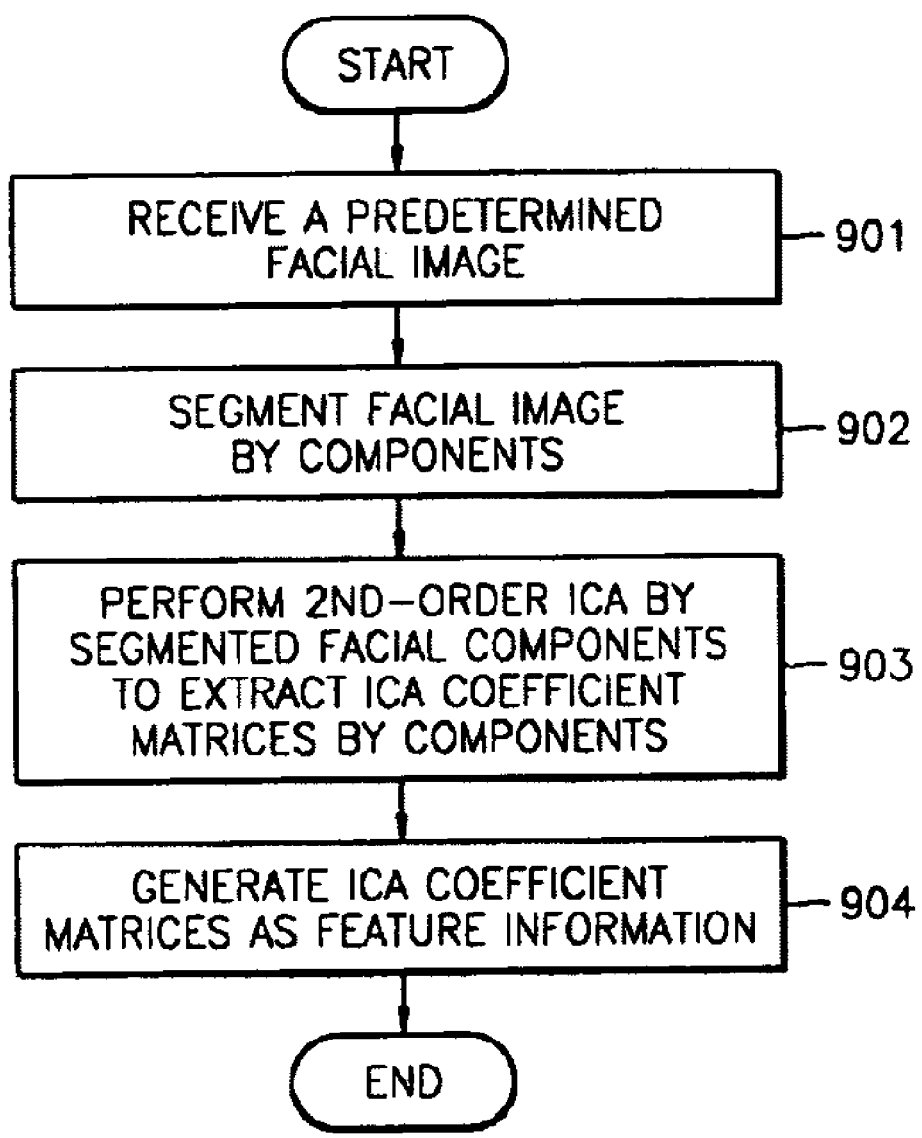
FIG. 9 is a flow chart diagram of a method of extracting second feature information corresponding to a predetermined facial image using component-based PCA/ICA according to the present invention.

FIG. 9 is a flow chart diagram of a method of extracting second feature information corresponding to a predetermined facial image using component-based PCA/ICA according to the present invention. In step 901, a predetermined facial image is received. In step 902, the facial image is segmented by components. In step 903, the 2nd-order ICA shown in FIG. 8 is performed on the facial image by components to extract ICA coefficient matrices (first feature information). In step 904, the first feature information is recognized as second feature information featuring the facial image.

Figure 10:
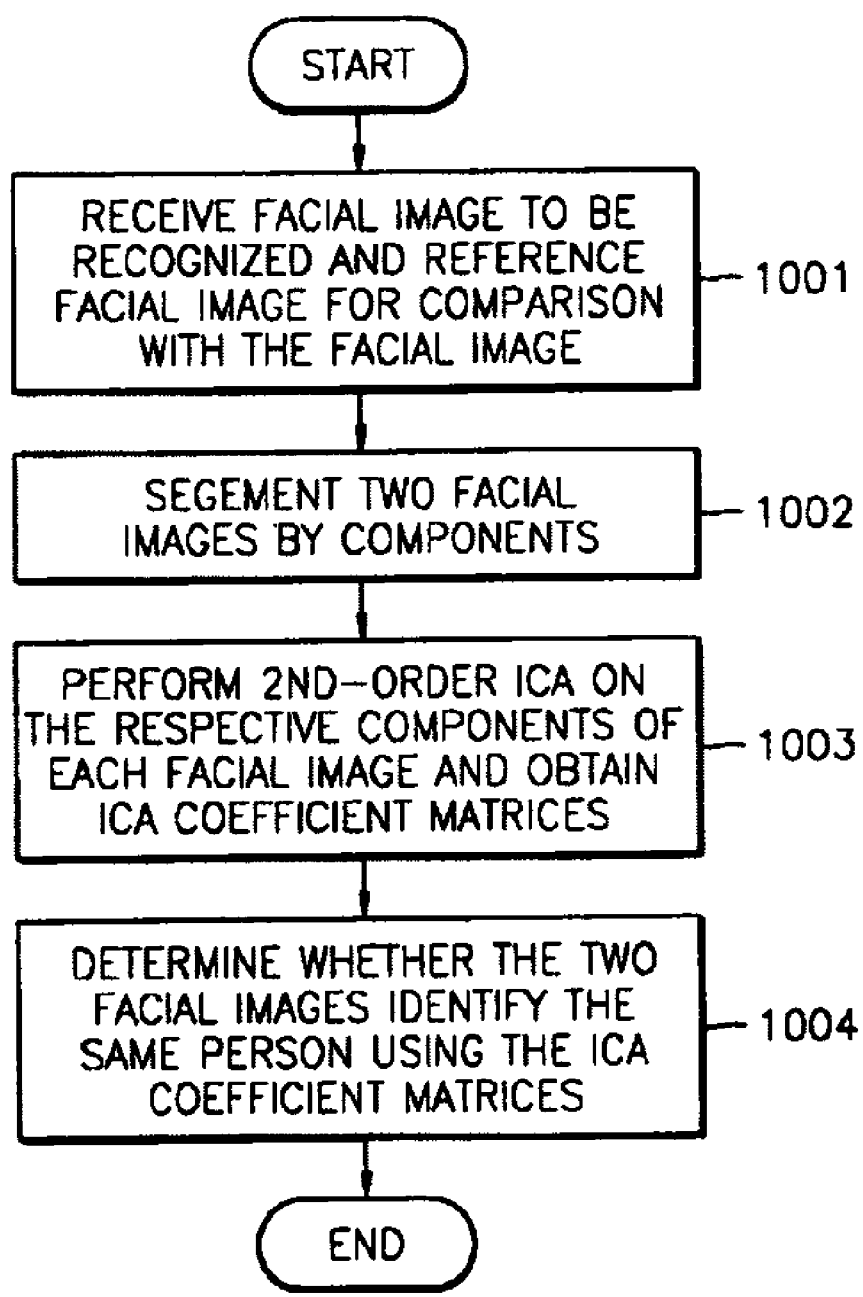
FIG. 10 is a flow chart diagram of a method of recognizing a face using component-based PCA/ICA according to the present invention.

FIG. 10 is a flow chart diagram of a method of recognizing a face using component-based PCA/ICA according to the present invention.

In step 1001, a facial image to be recognized and a reference facial image comparable with the facial image are received. In step 1002, the two facial images are segmented by components like in step 902 shown in FIG. 9. In step 1003, a 2nd-order ICA is performed on the respective components of each facial image, ICA coefficient matrices (first feature information) are obtained by component and second feature information corresponding to each facial image is generated. In step 1004, it is determined whether the two face images identify the same person, using the second feature information corresponding to each facial image. Here, in order to determine whether the two facial images are photographed from the same person, it is necessary to calculate Equation 9 to obtain the solution. If the obtained solution is greater than or equal to a predetermined value, it is determined that the two facial images are from the same person.

Figure 11:
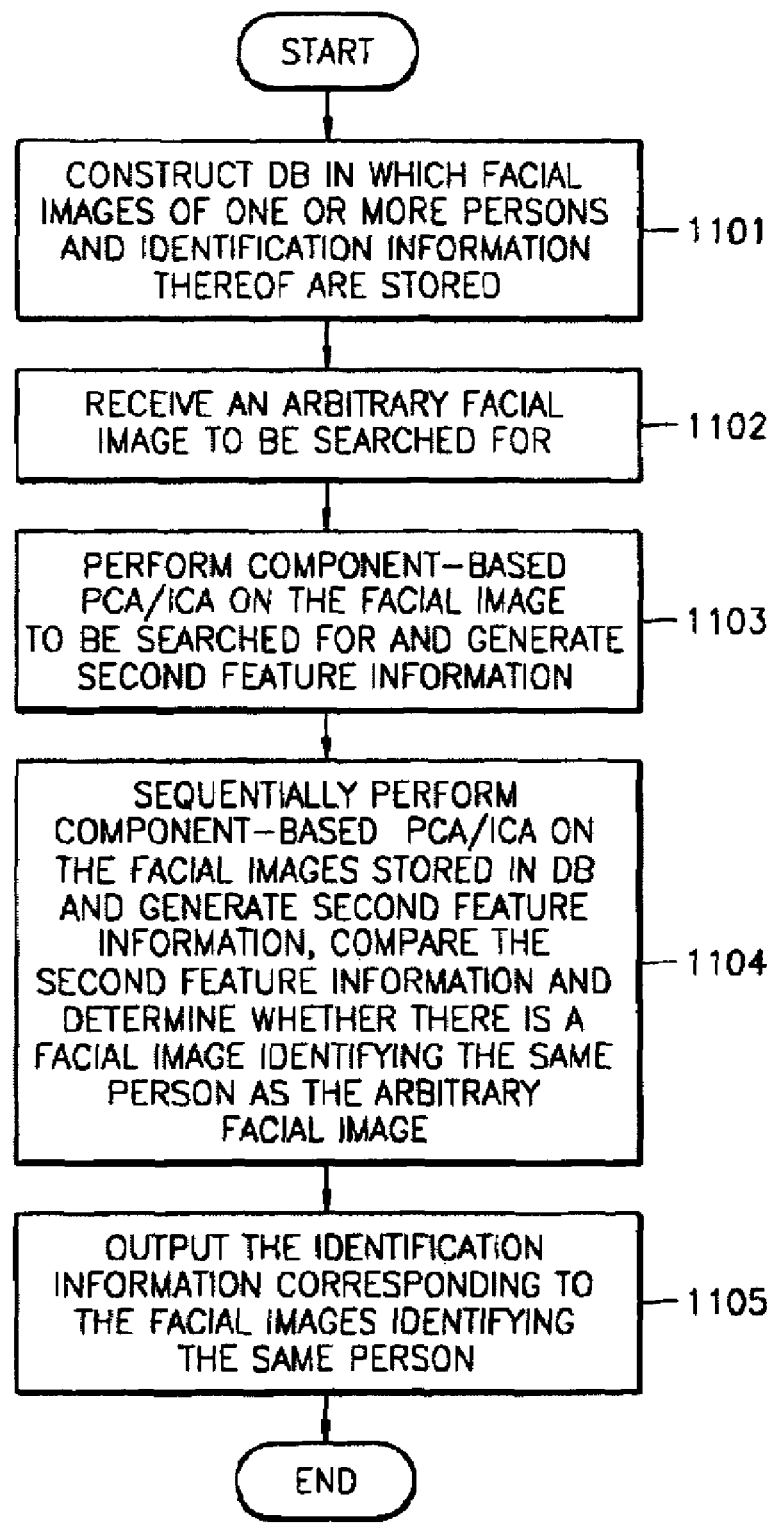
FIG. 11 is a flow chart diagram of a method of searching for a face using component-based PCA/ICA according to an embodiment of the present invention.

FIG. 11 is a flow chart diagram of a method of searching for a face using component-based PCA/ICA according to an embodiment of the present invention.

In step 1101, a database (DB) in which facial images of one or more persons and identification information of the persons are stored, is constructed. In step 1102, an arbitrary facial image to be searched for is received. In step 1103, the component-based PCA/ICA are performed on the facial image to be searched for and second feature information is generated. In step 1104, the component-based PCA/ICA are sequentially performed on the facial images stored in the DB and second feature information is generated, and the generated second feature information is compared with the second feature information corresponding to the facial image to be searched for, thereby determining whether there is a facial image identifying the same person as the facial image to be searched for. If yes, identification information corresponding to the facial image is output from the DB, in step 1105.

Here, Equation (9) is used to determine whether the two face images identify the same person. If the solution of Equation (9) is greater than or equal to a predetermined value, it is determined that the facial images identify the same person.

Figure 12:
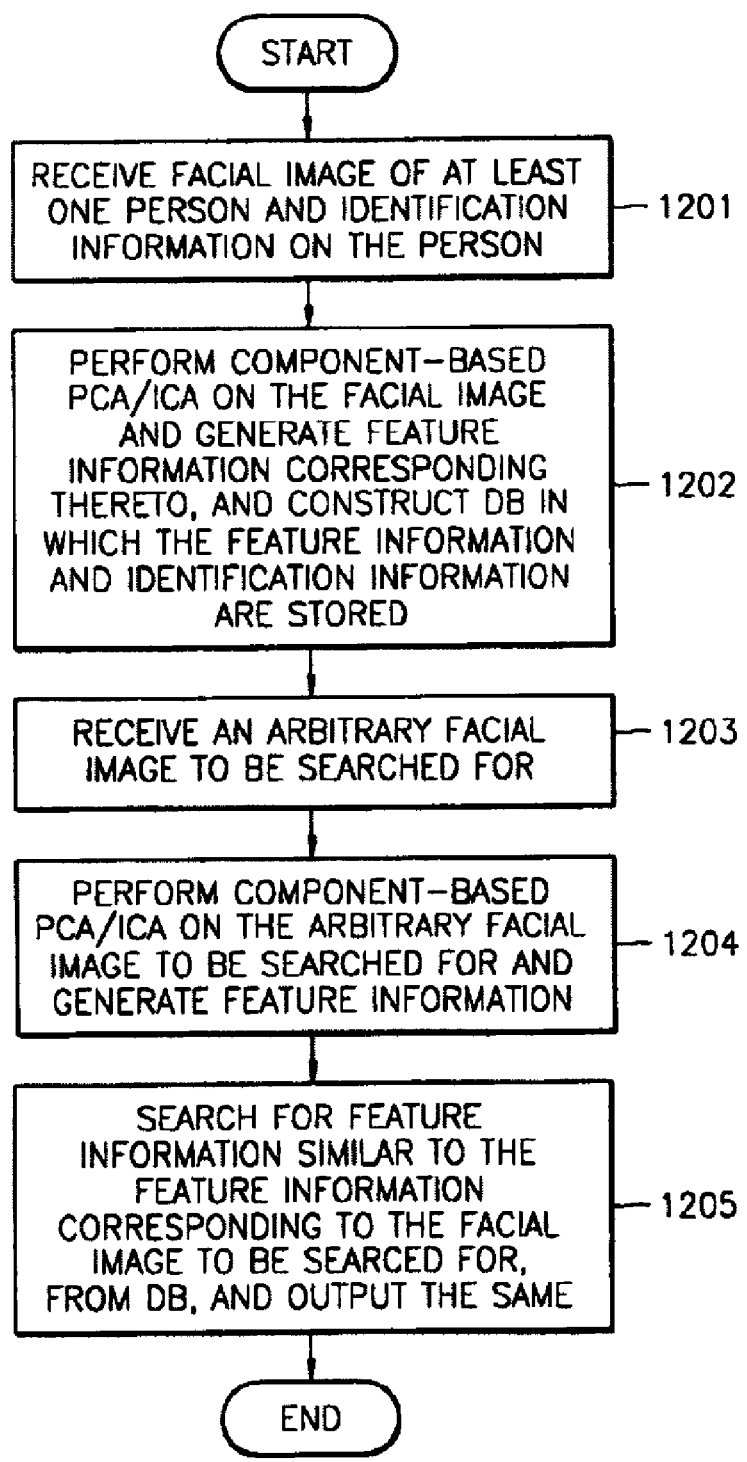
FIG. 12 is a flow chart diagram of a method of searching for a face using component-based PCA/ICA according to another embodiment of the present invention.

FIG. 12 is a flow chart diagram of a method of searching for a face using component-based PCA/ICA according to another embodiment of the present invention.

In step 1201, a facial image of at least one person and identification information of the person are received. In step 1202, the component-based PCA/ICA are performed on the facial image and second feature information corresponding to the facial image is generated, and the second feature information and the identification information are linked to then be stored, thereby constructing a database (DB). In step 1203, an arbitrary facial image to be searched for is received. In step 1204, the component-based PCA/ICA are performed on the arbitrary facial image to be searched for and second feature information is generated. In step 1205, the second feature information similar to the second feature information corresponding to the facial image to be searched for is detected from the DB to then be output.

Figure 13:
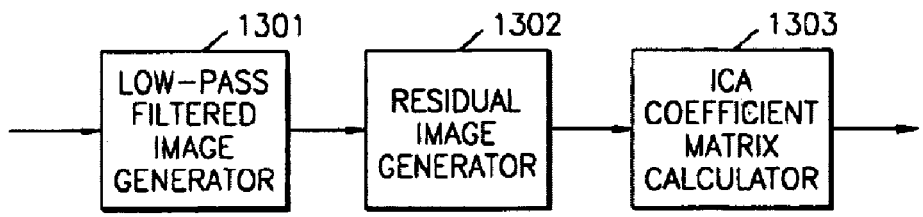
FIG. 13 is a block diagram of an apparatus of extracting first feature information of a predetermined image using 2nd-order ICA according to an embodiment of the present invention.

FIG. 13 is a block diagram of an apparatus of extracting first feature information of a predetermined image using 2nd-order ICA according to an embodiment of the present invention.

The apparatus of extracting first feature information of a predetermined image using 2nd-order ICA according to an embodiment of the present invention includes a low-pass filtered image generator 1301, a residual image generator 1302, and an ICA coefficient matrix calculator 1303.

The low-pass filtered image generator 1301 receives information of an arbitrary image, performs PCA thereon and generates a low-pass filtered image by removing high-frequency components from the received arbitrary image.

The residual image generator 1302 subtracts the low-pass filtered image information from the received image information and generates residual images.

The ICA coefficient matrix calculator 1303 performs ICA on the residual images and obtains basis images and an ICA coefficient matrix.

Figure 14A:
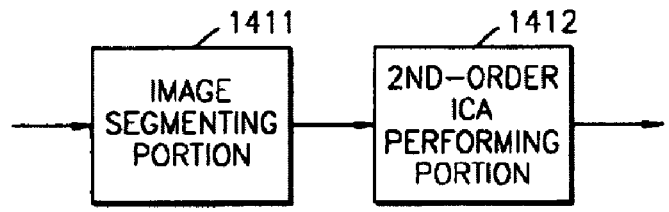
FIG. 14A is a block diagram of an apparatus of extracting second feature information corresponding to a predetermined facial image using component-based PCA/ICA according to the present invention.

FIG. 14A is a block diagram of an apparatus of extracting second feature information corresponding to a predetermined facial image using component-based PCA/ICA according to the present invention.

The apparatus includes an image segmenting portion 1411 and a second ICA performing portion 1412.

The image segmenting portion 1411 segments the facial image information by facial components contained in the received facial image information. In order to slice a facial image, as described above, components defined by Heisele et al. in IEEE International Conference on Computer Vision, or components defined by Nefian and Davies in IEEE International Conference on Acoustics, Speech, and Signal Processing, can be selectively used. Since positions of those components must contain meaningful facial features, several fiducial points are manually positioned.

The second ICA performing portion 1412 performs the same function as that of the first feature information extracting apparatus using second ICA shown in FIG. 13, with only a difference in that second ICA is performed on each piece of facial image information by components segmented by the image segmenting portion 1411.

Figure 14B:
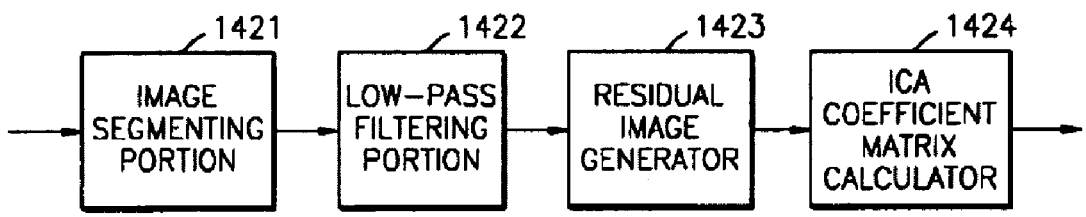
FIG. 14B is a detailed block diagram of FIG. 14A.

FIG. 14B is a detailed block diagram of FIG. 14A, showing that the second ICA performing portion 1412 includes various blocks, that is, an image segmenting portion 1421, a low-pass filtering portion 1422, a residual image generator 1423 and an ICA coefficient calculating portion 1424, which perform the same functions as those of corresponding portions shown in FIGS. 13 and 14A.

Figure 15:
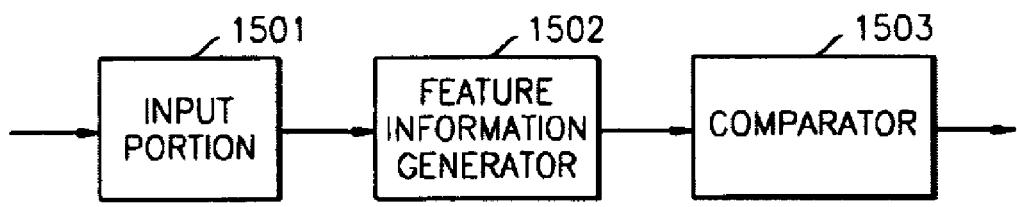
FIG. 15 is a block diagram of an apparatus of recognizing a face using component-based PCA/ICA according to the present invention.

FIG. 15 is a block diagram of an apparatus of recognizing a face using component-based PCA/ICA according to the present invention.

The apparatus of recognizing a face using component-based PCA/ICA according to the present invention includes an input portion 1501, a feature information generator 1502 and a comparator 1503.

The input portion 1501 receives an arbitrary facial image to be recognized and a basis facial image for the arbitrary facial image (a facial image which is a basis in determining whether the both facial images identify the same person) and supplies the received information to the feature information generator 1502.

The feature information generator 1502 has the same structure as and performs the same function as that of the apparatus for generating the second feature information according to the present invention shown in FIG. 14A or 14B. In other words, the feature information generator 1502 segments the facial image information by facial components contained in the received facial image information, performs PCA on the segmented pieces of the information to generate low-pass filtered images, subtracts the low-pass filtered images from the received image information and generates residual images, performs ICA on the residual images, and obtains basis images and an ICA coefficient matrix (fist feature information). Then, the feature information generator 1502 extracts pieces of second feature information, that is, sets of first feature information corresponding to the information on the two facial images.

The comparator 1503 compares second feature information corresponding to a facial image, which is the subject of comparison, with that of the basis facial image to determine whether the two facial images identify the same person, and outputs the determination result.

Figure 16:
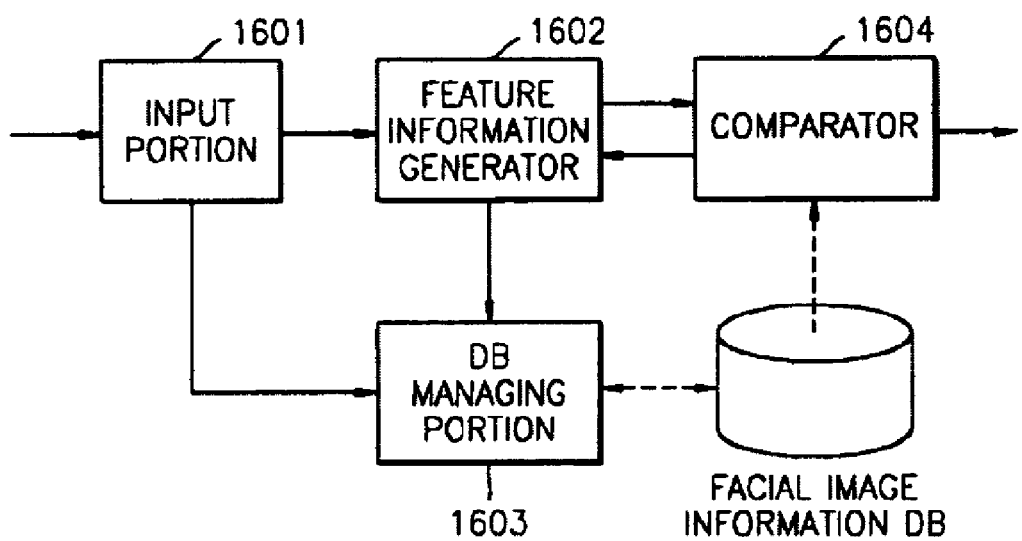
FIG. 16 is a block diagram of an apparatus of searching for a face using component-based PCA/ICA according to the present invention.

FIG. 16 is a block diagram of an apparatus of searching for a face using component-based PCA/ICA according to the present invention.

An input portion 1601 receives facial image information necessary for constructing a facial image information database (DB) for searching for a face, and supplies the same to a DB managing portion 1603 or a feature information generator 1602.

Also, the input portion 1601 receives a facial image to be searched for and supplies the same to the feature information generator 1602.

The feature information generator 1602 extracts second feature information from the facial image supplied from the input portion 1601 using the process shown in FIG. 9. Here, if the facial image is to be stored in the facial image information DB, the second feature information is supplied to the DB managing portion 1603, and if not, the second feature information is supplied to the comparator 1604. Also, the feature information generator 1602 receives facial image information read from the facial image information DB, extracts the second feature information for the facial image and supplies the same to the comparator 1604.

The DB managing portion 1603 stores the facial image information supplied from the input portion 1601 and the second feature information supplied from the feature information generator 1602, in the facial image information DB, and manages the information stored in the facial image information DB.

The comparator 1604 receives the second feature information corresponding to a facial image to be searched for, from the feature information generator 1602, and searches for a facial image of the same person as that of the facial image to be searched for from the DB, using the second feature information. If only information of the facial image is stored in the facial image information DB, the facial image information is read from the DB and supplies the same to the feature information generator 1602. Then, the comparator 1604 receives the second feature information corresponding to the facial image information and determines whether there is a facial image of the same person as that of the facial image to be searched for. If the second feature information corresponding to each facial image is stored in the facial image information DB, only the second feature information is read from the DB to then be compared with the second feature information corresponding to the facial image information to be searched for, thereby determining whether both facial images are from the same person.

Figure 17:
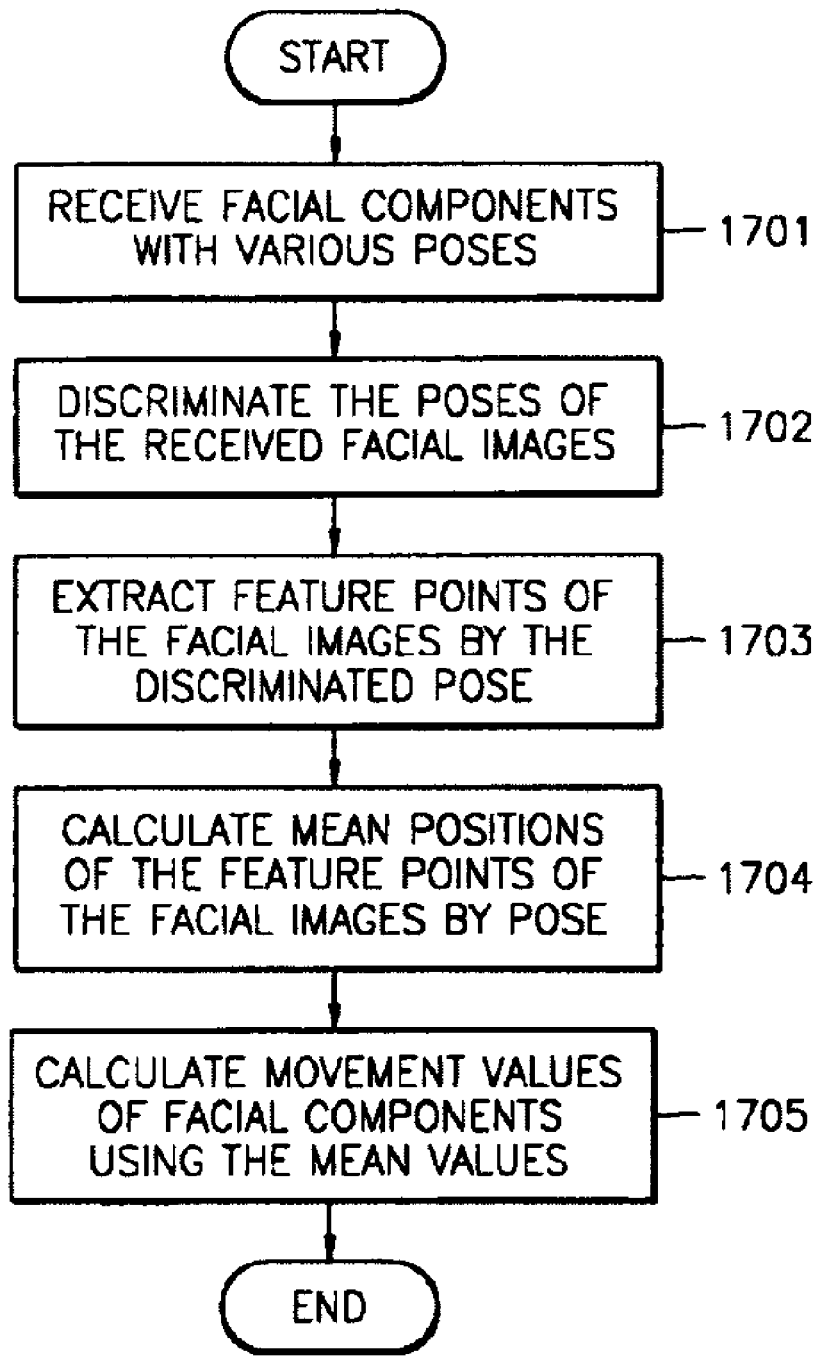
FIG. 17 is a flow chart diagram illustrating a method of calculating movement values of facial components with pose changes.

FIG. 17 is a flow chart diagram illustrating a method of calculating movement values of facial components with pose changes.

First, in step 1701, facial images with various poses are received. In step 1702, the poses of the received facial images are discriminated to obtain facial image information by pose. Here, the poses may be visually discriminated by external viewers, or may be automatically discriminated by a predetermined method.

In step 1703, feature points of the facial images are extracted by the pose discriminated in step 1702. In such a manner, sets of feature points for each facial image are obtained. Information of the feature points of the facial images may also be manually input by persons, or may be automatically determined by a predetermined method.

In step 1704, mean positions of the feature points of the facial images by pose are calculated to obtain mean value information of the feature points. In step 1705, movement value information of facial components depending on pose changes is calculated using the mean value information to obtain movement value information of facial components for each pose.

The above-described embodiments of the present invention can be prepared by a computer executable program, and can be implemented by a general-purpose digital computer operating the program using computer readable media. Various forms of the computer readable media include magnetic storage media, e.g., ROMs, floppy disks or hard disks, optically readable media, e.g., CD-ROMs or DVDs, and carrier waves, e.g., transmission over the Internet.

According to the present invention, the component-based scheme using 2nd-order ICA/PCA encodes each facial component separately. Thus, since the relative positions of pixels within each facial component are little affected by pose changes, this scheme is robust to pose changes. When the component positions are aligned using a facial component detection scheme, the recognition performance can be further increased.

On the other hand, the component-based scheme allows segmented facial components to overlap each other and keeps important relationships for representing features required to distinguish an individual by partially encoding the relationship between adjacent facial components. Thus, a descriptor according to this invention stores the minimum amount of information required to identify an individual. Geometrical information obtained for various poses may be deleted.

Since a facial component is less statistically-complicated than the overall facial image, it is easier to learn ICA model than the overall facial region.

Figure 18:
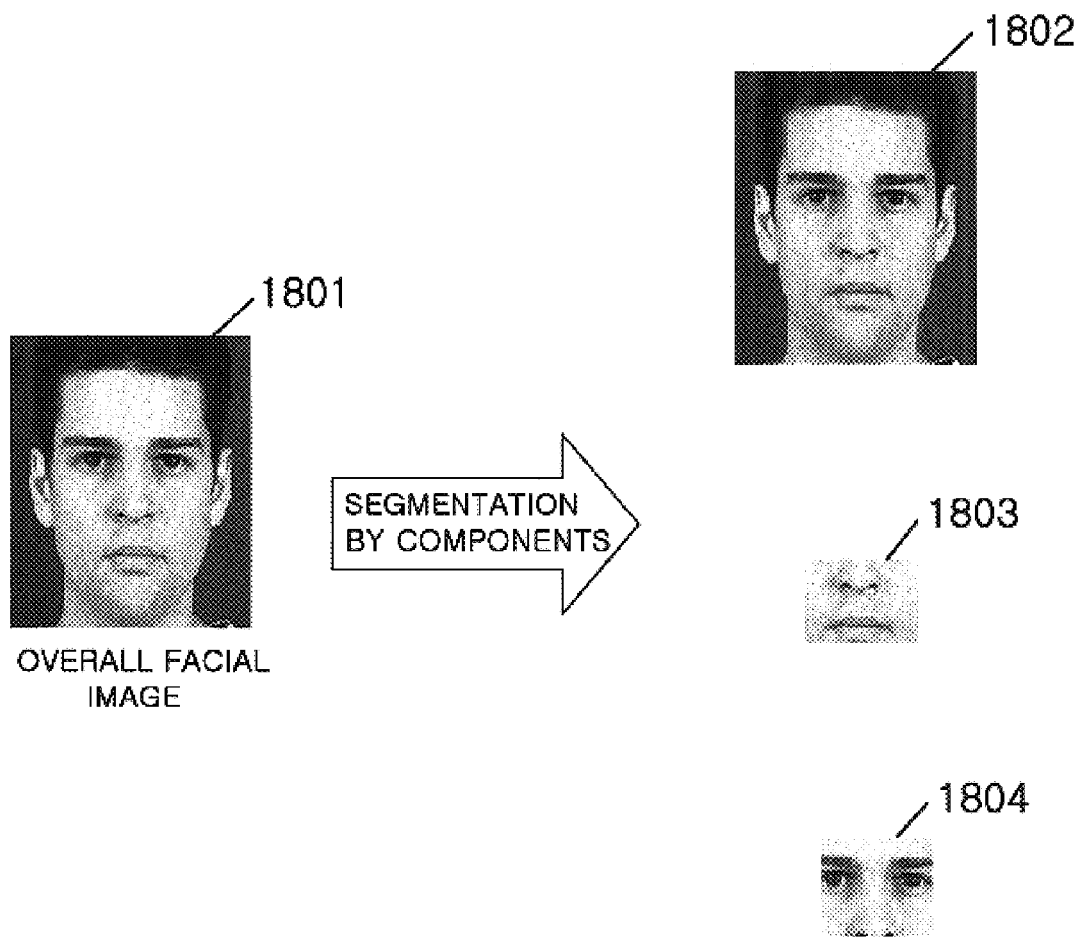
FIG. 18 is a reference diagram illustrating a method of improving performance by segmenting a facial image by components.

FIG. 18 is a reference diagram illustrating a method of improving performance by segmenting a facial image by components. Referring to FIG. 18, a facial area denoted by reference numeral 1801 is segmented into different facial components, that is, an area covering nose and mouth and an area covering eyes, denoted by reference numerals 1803 and 1804, respectively. Actually, a facial image covered by an area 1802 is actually the same as the overall facial image 1801.

According to the present invention, the recognition performance can be increased even when the facial image is segmented by components to be processed without compensation for the facial image with pose changes, compared to the conventional method in which the overall facial image is considered as a single component (denoted by 1801) to be processed.

While this invention has been particularly shown and described with reference to preferred embodiments thereof, it will be understood by those skilled in the art that various changes in form and details may be made therein without departing from the spirit and scope of the invention as defined by the appended claims. Thus, the embodiments should not be construed as limiting this invention, but the true scope of which is determined by the following claims and their equivalents.

What is claimed is:

1. A method of recognizing a face using component-based independent component analysis (ICA)/principal component analysis (PCA), the method comprising the steps of:
    (a) segmenting a predetermined input facial image by facial components and generating segmented images;
    (b) performing PCA on the segmented images to generate low-pass filtered images;
    (c) calculating a difference between the low-pass filtered images and the segmented images to obtain residual images; and
    (d) performing ICA on the residual images and generating first feature information corresponding to the segmented images, and generating pieces of second feature information as a set of the pieces of the first feature information.

2. A computer-readable recording medium in which a program for executing the method claimed in claim 1 in a computer, is recorded.

3. A method of recognizing a face using component-based principal component analysis (PCA)/independent component analysis (ICA), the method comprising the steps of:
    (a) receiving a first facial image to be recognized and a second facial image to be used as a basis for comparison with the first facial image;
    (b) performing component-based PCA/ICA on the first and second facial images, respectively, and extracting pieces of second feature information corresponding to the first and second facial images, wherein the performing component-based PCA/ICA includes performing PCA on the first and second facial images, obtaining residual images by calculating a difference between images generated by the PCA and the first and second facial images, and performing ICA on the residual images; and
    (c) determining whether there is a similarity between the pieces of the second feature information corresponding to the first and second facial images, and outputting the determination result.

4. The method of claim 3, wherein the step (b) comprises:
    (b1) segmenting the first and second facial images by facial components and generating first and second segmented images;
    (b2) performing PCA on the first and second segmented images to generate first and second low-pass filtered images corresponding thereto by removing high-frequency components from the first and second segmented images;
    (b3) calculating a difference between the low-pass filtered images and the first and second segmented images to obtain first and second residual images having high-frequency components; and
    (b4) performing ICA on the first and second residual images to generate pieces of first feature information corresponding to the first and second segmented images, and generating pieces of second feature information as sets of pieces of the corresponding first feature information.

5. The method of claim 3, wherein the step (c) comprises:
    (c1) expressing the pieces of first feature information corresponding to the first and second segmented images as vectors;
    (c2) obtaining a first result values by dividing an inner product of a pair of vectors corresponding to same components of the first and second facial images by norms of the vectors; and
    (c3) obtaining a sum of the first result values and determining whether the first and second facial images identify a same person by comparing the sum to a predetermined reference value.

6. The method of claim 5, wherein the step (c3) comprises obtaining a sum of second result values multiplied by a predetermined weighting factor and determining whether the first and second facial images identify the same person by comparing the sum to a predetermined reference value.

7. A computer-readable recording medium in which a program for executing the method claimed in claim 3 in a computer, is recorded.

8. A method of searching for a face using component-based principal component analysis (PCA)/independent component analysis (ICA), the method comprising:
    (a) constructing a database (DB) in which facial images of one or more persons and identification information of the persons are stored;
    (b) receiving a facial image to be searched for from the DB;
    (c) performing the component-based PCA/ICA on the facial image to be searched for and generating second feature information, wherein the performing component-based PCA/ICA includes performing PCA on the facial image to be searched for, obtaining a residual image by calculating a difference between an image generated by the PCA and the facial image to be searched for, and performing ICA on the residual image;
    (d) sequentially reading facial images stored in the DB, and performing the component-based PCA/ICA on the read facial images and generating second feature information;
    (e) comparing the second feature information corresponding to a facial image read from the DB with the second feature information corresponding to the facial image to be searched for, and determining whether the two facial images identify a same person; and
    (f) reading identification information corresponding to the facial image from the DB and outputting the identification information if it is determined that the facial images identify the same person.

9. The method of claim 8, wherein the generating the second feature information of step (c) comprises:
    segmenting the facial images by facial components and generating segmented facial images;
    performing PCA on the segmented facial images to generate low-pass filtered images by removing high-frequency components from the segmented facial images;

calculating a difference between the low-pass filtered images and the segmented images to generate residual images corresponding to the segmented facial images; and performing ICA on the residual images which correspond to the segmented facial images and generating pieces of first feature information as ICA coefficient matrices, and generating pieces of second feature information as sets of pieces of the corresponding first feature information.

10. The method of claim 8, wherein the step (e) comprises:
(e1) expressing the pieces of first feature information corresponding to the facial image to be searched for and the facial image stored in the DB as vectors;
(e2) obtaining a first result values by dividing an inner product of a pair of vectors corresponding to same components of the facial images by norms of the vectors; and
(e3) obtaining a sum of the first result values and determining whether the facial images identify the same person by comparing the sum to a predetermined reference value.

11. The method of claim 10, wherein the step (e3) comprises obtaining second result values by multiplying respective first result values by a predetermined weighting factor, and determining whether the facial images identify the same person by comparing the sum to a predetermined reference value.

12. A computer-readable recording medium in which a program for executing the method claimed in claim 8 in a computer, is recorded.

13. A method of searching for a face using component-based principal component analysis (PCA)/independent component analysis (ICA), the method comprising:
(a) constructing a database (DB) in which facial images of one or more persons and identification information of the persons are stored;
(b) receiving a facial image to be searched for from the DB;
(c) performing the component-based PCA/ICA on the facial image to be searched for and generating second feature information, wherein the performing component-based PCA/ICA includes performing PCA on the facial image to be searched for, obtaining a residual image by calculating a difference between an image generated by the PCA and the facial image to be searched for, and performing ICA on the residual image; and
(d) detecting second feature information similar to the second feature information corresponding to the facial image to be searched for from the DB and outputting the detected second feature information.

14. A computer-readable recording medium in which a program for executing the method claimed in claim 13 in a computer, is recorded.

15. An apparatus for generating feature information using component-based principal component analysis (PCA)/independent component analysis (ICA), the apparatus comprising:
an image segmenting portion which segments a predetermined input original facial image by facial components included in the input original facial image and generates segmented facial images;
a low-pass filtered image generator which performs PCA on the segmented facial images to generate low-pass filtered images by removing high-frequency components from the input image;
a residual image generator which calculates a difference between the low-pass filtered images and the segmented images to generate residual images; and
an ICA coefficient matrix calculator which performs ICA on the residual images and generates pieces of first feature information corresponding to the segmented images, and generates pieces of second feature information as a set of the pieces of first feature information.

16. An apparatus for extracting a face using component-based principal component analysis (PCA)/independent component analysis (ICA), the apparatus comprising:
an input portion which receives a first facial image to be recognized and a second facial image to be used as a basis for comparison with the first facial image;
a feature information generator which performs component-based PCA/ICA on the first and second facial images and generates pieces of second feature information as a set of ICA coefficient matrices corresponding to facial components, wherein the feature information generator performs PCA on the first and second facial images, obtains residual images by calculating a difference between images generated by the PCA and the first and second facial images, and performs ICA on the residual images; and
a comparator which compares a piece of second feature information corresponding to the first facial image to a piece of second feature information corresponding to the second facial image to determine whether there is a similarity therebetween, and outputs the determination result.

17. The apparatus of claim 16, wherein the feature information generator comprises:
an image segmenting portion which segments the input original facial image by facial components and generates segmented facial images;
a low-pass filtering portion which performs PCA on the segmented images to generate low-pass filtered images by removing high-frequency components from the segmented images;
a residual image generator which calculates a difference between the low-pass filtered images and the segmented images to generate residual images having the high-frequency components; and
an ICA coefficient matrix calculator which performs ICA on the residual images and generates pieces of first feature information corresponding to the segmented images, and generates pieces of second feature information as a set of the pieces of first feature information.

18. An apparatus for searching for a face using component-based principal component analysis (PCA)/independent component analysis (ICA), the apparatus comprising:
an input portion which receives facial images used in constructing a facial image information database (DB) and a facial image to be searched for that is included in the DB;
a feature information generator which receives facial images from the input portion, performs the component-based PCA/ICA on the facial images and generates pieces of second feature information corresponding to the facial images, wherein the feature information generator performs PCA on the facial images, obtains residual images by calculating a difference between images generated by the PCA and the facial images, and performs ICA on the residual images;

a DB managing portion which stores the second feature information corresponding to the facial images used in constructing the DB and supplied from the feature information generator, and manages the information to be stored in the DB; and a comparator which receives the second feature information corresponding to the facial image to be searched for from the feature information generator, searches for second feature information similar to the received second feature information, and determines whether the facial images identify a same person by comparing a degree of similarity to a predetermined reference value.

19. The apparatus of claim 18, wherein the DB managing portion receives and stores the facial images used in constructing the DB from the input portion, wherein the comparator sequentially reads facial images stored in the DB and supplies the read facial images to the feature information generator, receives pieces of second feature information corresponding to a facial image in the DB, compares the second feature information corresponding to the facial image stored in the DB with the second feature information corresponding to the facial image to be searched for, and determines whether the facial images identify the same person, and wherein the feature information generator receives the facial image to be searched for from the input portion, receives the facial image in the DB from the comparator, performs the component-based PCA/ICA on the facial images and generates pieces of second feature information corresponding to the facial images.

20. The apparatus of claim 18, wherein the feature information generator comprises:

an image segmenting portion which segments the facial images used in constructing the DB and the facial image to be searched for by facial components and generates segmented facial images;

a low-pass filtering portion which performs PCA on the segmented facial images to generate low-pass filtered images by removing high-frequency components from the segmented facial images;

a residual image generator which calculates a difference between the low-pass filtered images and the segmented images to generate residual images having the high-frequency components; and an ICA coefficient matrix calculator which performs ICA on the residual images and generates pieces of first feature information corresponding to the segmented images, and generates pieces of second feature information as a set of the pieces of first feature information.

* * * * *